Patented Mar. 14, 1939

2,150,389

UNITED STATES PATENT OFFICE 2,150,389

COLORING OF LEATHER

Mordecai Mendoza and George Stuart James White, Blackley, Manchester, England, assignors to Imperial Chemical Industries Limited, a corporation of Great Britain No Drawing. Application February 15, 1937, Serial No. 125,932. In Great Britain February 21, 1936

4 Claims. (Cl. 8—13)

This invention relates to the coloring of leather, and especially to the coloring of leather with certain azo dyes, and to leathers dyed with the dyes.

Heretofore the dyeing of leather has been made possible by the use of certain acid dyestuffs and direct cotton dyestuffs which were found to be applicable by reason of their ability to dye leather and to be operable at relatively low temperatures and from baths which were not deleterious to the leather, but these dyes did not produce colors which were entirely satisfactory from the standpoint of fastness to washing. When these dyestuffs were used it was necessary to produce an inferior product or to employ additional treatments to diminish the unsatisfactory character of the dyeing. As such products are unsatisfactory from considerations of cost or quality, it is desirable to provide better processes for dyeing leather.

This invention has as an object to provide new methods of coloring leather. A further object is to provide methods by which a very wide range of colored leathers can be made. A still further object is to provide new methods of coloring leather which will show better fastness to light and washing than by methods known to the prior art. These and other objects will appear in the following description as the invention is more particularly described.

These objects are accomplished generally by applying certain azo dye components to the leather. We have found that we can dye leather by applying successively thereto in either order an aqueous solution of an aromatic diazo compound devoid of sulphonic or carboxylic groups, and an aqueous solution of a coupling component of the class comprising naphthylamine- and aminonaphthol-sulphonic acids and their N-substituted derivatives.

In general, the coupling components are preferably dissolved in water by means either of weak alkalies such as sodium borate or sodium bicarbonate. In any case it is desirable that the aqueous solutions of the coupling components should have a degree of acidity or alkalinity within the range pH 3.0 to pH 9.0 so as to minimize any possibility of damage to the leather when applied.

The aqueous solutions of the diazo compounds may be obtained by directly diazotizing the amines therein or conveniently by dissolving suitable stabilized diazo salts in water. It will be understood that the acidity of such solutions should if necessary be adjusted to fall within the pH range referred to above before application to the leather.

As already indicated the coupling component may first be applied to the leather and the diazo compound applied subsequently or vice versa. Where the leather has been tanned with a vegetable tanning agent it is preferred to apply the coupling component before the diazo compound but if the diazo component is applied first there should be a sufficient excess of the diazo component over that which may be exhausted by any reactive tanning agent so that coupling compounds of the diazo and coupling components will be effected. The aqueous solutions may be applied to the surface of the leather by, for example, brushing or spraying or the leather may be immersed in the solutions, preferably in drums or paddles adapted for the dyeing of leather.

This invention is illustrated but not limited by the following examples, in which the parts are by weight.

Example I 100 parts of chrome calfskin are neutralized by treatment for 30 minutes in the drum with a solution of 1 part of sodium bicarbonate in 200 parts of water. A solution of 2 parts of 1-amino-8-naphthol-4:6-disulphonic acid in 20 parts of water and 1 part of sodium bicarbonate is then added and the leather drummed for 10 minutes. The leather is then removed from the drum and allowed to drain. Meanwhile the drum is emptied of the solution of coupling component, rinsed out with water and recharged with a solution of 5 parts of a stabilized diazo salt obtained from 4-chloro-2-nitroaniline (see British specification 238,676) in 200 parts of water. The drained leather is now entered and drummed for 10 minutes. The leather, which is colored a maroon shade, is then removed, rinsed, fat-liquored and dried in the usual way.

Example II

A chrome sheepskin is struck out on the staining table and evenly brushed with a solution at 30° C. of 2 parts of a technical mixture of 1-naphthylamine-6- and 1-naphthylamine-7-sulphonic acids, 100 parts of water and 1 part of sodium bicarbonate. After standing for a short time the surplus liquid is pressed off the surface of the leather and a 2% aqueous solution of the stabilized diazo salt obtained from naphthalene trisulphonic acids and diazotized m-chloroaniline (see British specification 280,945) is then applied to the leather by brushing until an orange-brown shade is obtained. The colored leather so obtained is then rinsed, fat liquored and dried in the usual way.

Example III o-Nitroaniline is diazotized in the customary manner and the aqueous diazo solution so obtained is if necessary diluted with cold water to a strength equivalent to 0.5 part of the original o-nitroaniline in 100 parts of water. The pH value of the resulting dilute diazo solution is adjusted to pH 3.0 by suitable additions of sodium acetate.

A wet chrome-tanned sheepskin is struck out and brushed evenly with an aqueous solution at 30% C. of 2 parts of 5:5'-dihydroxy-2:2'-dinaphthylurea-7:7'-disulphonic acid and 1 part of sodium bicarbonate in 100 parts of water. After standing for a short time the surplus liquid is pressed off the surface of the sheepskin which is then brushed with a solution of diazotized o-nitroaniline prepared as described above.

The leather is colored a bright orange shade which has good fastness to water and to soap washing.

Example IV

A chrome tanned leather which had been stained with leukenol (an aldehyde-phenolic sulphonate condensation product) and crusted was wet out in a dilute solution of ammonia in accordance with the practice known to the art, and the excess water was struck out. A 2% solution of chromotrope acid having a pH value between 3.0 and 9.0 and temperature of about 25° to 30° C. was applied by brushing the solution on the grain side of the leather. Any surplus of solution was removed, and then a 2% aqueous solution of the diazo salt of 2:5-dichloraniline having a pH value between 3.0 and 9.0 and a temperature of about 25° to 30° C. was brushed on, followed by the removal of any excess of the solution. After rinsing and drying the leather was found to be a red shade and dyed only on the grain side, the back side being undyed. A good penetration of the dye was obtained on the grain side and a good dyeing fast to washing was obtained.

By a similar procedure crusted formaldehyde tanned leather and a chrome formaldehyde tanned leather were dyed, and similar results were obtained. In like manner an aldehyde tanned wet stock before fat liquoring and drying was dyed with similar results.

A crusted alum tanned leather was prepared for dyeing by wetting out in a 10% salt solution at 90° F. After wetting out, similar results were obtained on this leather by the above procedure, except that the shades were somewhat fuller on the alum tanned leather than on the other types of tannages.

Example V

Leukanol stained crusted stock like that used in Example IV was wet out in the same manner and agitated in a drum for 30 minutes with a 2% chromotrope acid solution having a pH value between 3.0 and 9.0 and a temperature of about 25° to 30° C. The surplus of solution was drained off and the leather was again agitated in the drum for 30 minutes at the same temperature with a 2% solution of the diazo salt from 2:5-dichloraniline. The solution of diazo salt had a pH value between 3.0 and 9.0. After 30 minutes the latter solution was drained off and the dyed leather was rinsed and dried. The leather was dyed a red shade on both sides with fair penetration. A good dyeing fast to washing was obtained.

By similar procedure, similar results were obtained on aldehyde tanned stock and chrome formaldehyde tanned stock both in the blue and in the crusted condition. In the drum dyeing of alum tanned leather which was wet out as described in Example IV results comparable with those obtained in brush dyeing were obtained. The order of applying the compounds of the dye in the foregoing examples may be reversed if desired.

The term crusted leather refers to leather such as that which has been treated with a tanning material, with a suitable fat liquor and dried. Such leather is distinguished from leather in the blue in that the latter is tanned leather immediately after it is neutralized.

As illustrative of other coupling components which may be used, the following are mentioned:

1-naphthylamine-6- or 7-sulphonic acids, or mixture thereof as obtained in works practice.
1-phenyl-aminonaphthalene-8-sulphonic acid.
2-aminonaphthalene-7-sulphonic acid.
1:8-aminonaphthol-4-sulphonic acid.
1:8-aminonaphthol-3:6-disulphonic acid.
1:8-aminonaphthol-2:4-disulphonic acid.
1-acetylamino-8-naphthol-3:6-disulphonic acid.
2:5-aminonaphthol-7-sulphonic acid.
2:8-aminonaphthol-6-sulphonic acid.
5:5'-dihydroxy-2:2'-dinaphthylamino-7:7'-disulphonic acid.

As illustrative of other diazo compounds which may be used, the diazo or tetrazo compounds derived from the following aryl amines are mentioned:

4:4'-diaminodiphenylamine.
o-Phenetol-azo-α-naphthylamine.
Dianisidine.
2-amino-5-benzoylamino-hydroquinone-diethyl and dimethyl ethers.
4-amino-4-ethoxydiphenylamine.
m-Chloroaniline.
o-Chloroaniline.
m-Nitroaniline.
3-nitro-4-aminoanisole.
4-chloro-5-amino-2-benzoylaminoanisole.
m-Nitro-p-toluidine-azo-cresidine.
α-Aminoanthraquinone.
5-nitro-2-aminoanisole.
p-Nitroaniline.
m-Nitro-p-toluidine.
4-chloro-2-aminoanisole.
5-nitro-2-aminotoluene.
5-chloro-2-aminotoluene.
2:5-dichloroaniline.
4-nitro-2-aminoanisole.
4-nitro-2-aminotoluene.
3-amino-6-benzoylamino-4-methoxytoluene.

In general any diazo compound derived from a primary aromatic amine or from an aminoazo compound which is devoid of sulphonic or carboxylic groups may be used.

This invention is a valuable advance in the art of dyeing leather as by suitable choice of coupling and diazo components and the concentration of solutions used, leather may be colored in a wide variety of shades and strengths. The colored leather may be aftertreated if desired with vegetable or synthetic tanning agents or fat-liquors in the usual way to vary character of leather. The fastness to water and alkali washing of the colored leather obtained by the process of the invention varies somewhat according to the number of water-solubilizing groups (e. g. sulphonic acid groups) in the coupling components used. In general, the washing fastness is superior to that of leather which has been dyed by the application of direct cotton dyestuffs or acid dyestuffs in the usual manner.

As many apparently widely different embodiments of this invention may be made without departing from the spirit and scope thereof, it is to be understood that we do not limit ourselves to the specific embodiments thereof except as defined in the appended claims.

We claim:

1. The process which comprises treating a wet-out leather with first one and then the other of the following solutions having a pH value of about 3.0 to about 9.0, namely an aqueous solution of an aromatic diazo compound which is devoid of sulphonic and carboxylic acid groups and an aqueous solution of a coupling component selected from the group consisting of naphthylamine-sulphonic acids, amino-naphthol-sulphonic acids, 1-phenylamino-naphthalene-8-sulfonic acid, 1-acetylamino-8-naphthol - 3:6 - disulfonic acid, 5:5'-dihydroxy-2:2'- dinapthylamino-7:7'-disulfonic acid and 5:5'-dihydroxy-2:2'-dinaphthylurea-7:7'-disulfonic acid, said treatment being continued until a substantial amount of the first applied substance is affixed to the leather, and removing unaffixed surplus contained in the first of said solutions before applying the second of said solutions.

2. The process which comprises treating a wet-out leather with first one and then the other of the following solutions having a pH value of about 3.0 to about 9.0, namely an aqueous solution of an aromatic diazo compound which is devoid of sulphonic and carboxylic acid groups and an aqueous solution of an amino-naphthol sulphonic acid, said treatment being continued until a substantial amount of the first applied substance is affixed to the leather, and removing unaffixed surplus contained in the first of said solutions before applying the second of said solutions.

3. The process which comprises treating a wet-out leather with a solution of an amino-naphthol sulphonic acid until a substantial amount of the component is affixed to the leather, removing surplus of said solution and applying an aqueous solution of an aromatic diazo compound which is devoid of sulphonic and carboxylic acid groups, said solutions having pH values between 3.0 and 9.0.

4. The process which comprises applying evenly to a wet-out leather a solution containing 2 parts of 5,5'-dihydroxy-2,2'-dinaphthylurea-7,7'-disulfonic acid and 1 part sodium carbonate in 100 parts of water, removing the surplus of said solution from the surface of the leather, and then applying a solution of diazotized orthonitraniline having a pH value of 3.

MORDECAI MENDOZA.
GEORGE STUART JAMES WHITE.

CERTIFICATE OF CORRECTION.

Patent No. 2,150,389.     March 14, 1939.

MORDECAI MENDOZA, ET AL.

It is hereby certified that error appears in the printed specification of the above numbered patent requiring correction as follows: Page 2, first column, line 15, for "30% C." read 30° C.; and that the said Letters Patent should be read with this correction therein that the same may conform to the record of the case in the Patent Office.

Signed and sealed this 23rd day of May, A.D. 1939.

Henry Van Arsdale
Acting Commissioner of Patents.

(Seal)

the number of water-solubilizing groups (e. g. sulphonic acid groups) in the coupling components used. In general, the washing fastness is superior to that of leather which has been dyed by the application of direct cotton dyestuffs or acid dyestuffs in the usual manner.

As many apparently widely different embodiments of this invention may be made without departing from the spirit and scope thereof, it is to be understood that we do not limit ourselves to the specific embodiments thereof except as defined in the appended claims.

We claim:

1. The process which comprises treating a wet-out leather with first one and then the other of the following solutions having a pH value of about 3.0 to about 9.0, namely an aqueous solution of an aromatic diazo compound which is devoid of sulphonic and carboxylic acid groups and an aqueous solution of a coupling component selected from the group consisting of naphthylamine-sulphonic acids, amino-naphthol-sulphonic acids, 1-phenylamino-naphthalene-8-sulfonic acid, 1-acetylamino-8-naphthol-3:6-disulfonic acid, 5:5'-dihydroxy-2:2'-dinapthylamino-7:7'-disulfonic acid and 5:5'-dihydroxy-2:2'-dinaphthylurea-7:7'-disulfonic acid, said treatment being continued until a substantial amount of the first applied substance is affixed to the leather, and removing unaffixed surplus contained in the first of said solutions before applying the second of said solutions.

2. The process which comprises treating a wet-out leather with first one and then the other of the following solutions having a pH value of about 3.0 to about 9.0, namely an aqueous solution of an aromatic diazo compound which is devoid of sulphonic and carboxylic acid groups and an aqueous solution of an amino-naphthol sulphonic acid, said treatment being continued until a substantial amount of the first applied substance is affixed to the leather, and removing unaffixed surplus contained in the first of said solutions before applying the second of said solutions.

3. The process which comprises treating a wet-out leather with a solution of an amino-naphthol sulphonic acid until a substantial amount of the component is affixed to the leather, removing surplus of said solution and applying an aqueous solution of an aromatic diazo compound which is devoid of sulphonic and carboxylic acid groups, said solutions having pH values between 3.0 and 9.0.

4. The process which comprises applying evenly to a wet-out leather a solution containing 2 parts of 5,5'-dihydroxy-2,2'-dinaphthylurea-7,7'-disulfonic acid and 1 part sodium carbonate in 100 parts of water, removing the surplus of said solution from the surface of the leather, and then applying a solution of diazotized orthonitraniline having a pH value of 3.

MORDECAI MENDOZA.
GEORGE STUART JAMES WHITE.

CERTIFICATE OF CORRECTION.

Patent No. 2,150,389.    March 14, 1939.

MORDECAI MENDOZA, ET AL.

It is hereby certified that error appears in the printed specification of the above numbered patent requiring correction as follows: Page 2, first column, line 15, for "30% C." read 30° C.; and that the said Letters Patent should be read with this correction therein that the same may conform to the record of the case in the Patent Office.

Signed and sealed this 23rd day of May, A.D. 1939.

Henry Van Arsdale
Acting Commissioner of Patents.

(Seal)